(12) United States Patent
Okado et al.

(10) Patent No.: US 10,055,112 B2
(45) Date of Patent: Aug. 21, 2018

(54) CONTROL PANEL

(71) Applicant: JTEKT Corporation, Osaka-shi (JP)

(72) Inventors: Yosuke Okado, Handa (JP); Hiroyuki Takahara, Chiryu (JP); Tatsuya Kimura, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 71 days.

(21) Appl. No.: 15/058,492

(22) Filed: Mar. 2, 2016

(65) Prior Publication Data

US 2016/0259537 A1 Sep. 8, 2016

(30) Foreign Application Priority Data

Mar. 3, 2015 (JP) ................. 2015-041795

(51) Int. Cl.
*G06F 3/048* (2013.01)
*G06F 3/0484* (2013.01)
*G06F 3/0481* (2013.01)
*G05B 19/409* (2006.01)

(52) U.S. Cl.
CPC ....... *G06F 3/04847* (2013.01); *G05B 19/409* (2013.01); *G06F 3/04817* (2013.01); *G06F 3/04842* (2013.01); *G05B 2219/23109* (2013.01); *G05B 2219/35481* (2013.01)

(58) Field of Classification Search
CPC ............. G06F 3/04847; G06F 3/04817; G06F 3/04842; G05B 19/409; G05B 2219/23109; G05B 2219/35481
USPC ....................................................... 715/778
See application file for complete search history.

(56) References Cited

U.S. PATENT DOCUMENTS

| | | | | |
|---|---|---|---|---|
| 5,105,220 A * | 4/1992 | Knodt | ................. | G03G 15/502 399/81 |
| 7,047,092 B2 * | 5/2006 | Wimsatt | ................. | G05B 15/02 345/173 |
| 7,187,884 B2 * | 3/2007 | Bardolatzy | ........... | G06F 3/1205 399/138 |
| 7,681,149 B2 * | 3/2010 | Lahdesmaki | ......... | G06F 3/0482 715/841 |
| 8,479,096 B2 * | 7/2013 | Terada | ................. | G06F 1/1626 715/702 |
| 8,875,056 B2 * | 10/2014 | Onogi | ................ | H04N 5/44543 348/333.02 |
| 8,966,379 B2 * | 2/2015 | Reeves | ................ | G06F 9/4443 345/158 |

(Continued)

FOREIGN PATENT DOCUMENTS

| | | |
|---|---|---|
| JP | 10-31510 | 2/1998 |
| JP | 2000-315105 | 11/2000 |

*Primary Examiner* — David Phantana-angkool
(74) *Attorney, Agent, or Firm* — Oblon, McClelland, Maier & Neustadt, L.L.P.

(57) ABSTRACT

A control panel includes an input portion to which an operation by an operator is input; a unified screen storage element that stores a unified screen that is a screen that is unified with respect to the plurality of types of controllers, and displays the data; a display portion capable of displaying a special screen and the unified screen; and an operation control portion that switches between displaying the special screen and the unified screen on the display portion based on information input to the input portion, and controls an actuator control portion based on information input to the input portion.

10 Claims, 11 Drawing Sheets

(56) References Cited

U.S. PATENT DOCUMENTS

| | | | | |
|---|---|---|---|---|
| 9,628,440 | B2 * | 4/2017 | Baum | H04L 63/02 |
| 9,632,490 | B2 * | 4/2017 | Grohman | G05B 15/02 |
| 9,651,925 | B2 * | 5/2017 | Filbeck | G05B 15/02 |
| 9,674,284 | B2 * | 6/2017 | Ding | H04L 43/065 |
| 9,702,582 | B2 * | 7/2017 | Svendsen | F24F 11/006 |
| 9,732,979 | B2 * | 8/2017 | Fadell | F24F 11/006 |
| D797,772 | S * | 9/2017 | Mizono | H04L 12/2807 |
| | | | | D14/486 |
| D803,241 | S * | 11/2017 | Mizono | D14/486 |
| 9,810,590 | B2 * | 11/2017 | Huppi | G01K 17/00 |
| 9,829,311 | B1 * | 11/2017 | Wilson | G01B 21/00 |
| 2004/0260427 | A1 * | 12/2004 | Wimsatt | G05B 15/02 |
| | | | | 700/275 |
| 2010/0106305 | A1 * | 4/2010 | Pavlak | F24F 11/001 |
| | | | | 700/276 |
| 2012/0026069 | A1 * | 2/2012 | Ohsaki | G06F 1/1616 |
| | | | | 345/1.2 |
| 2016/0259537 | A1 * | 9/2016 | Okado | G06F 3/04817 |

\* cited by examiner

| SWITCH LAMPS | SWITCH BUTTONS | SWITCH COORDINATES | INDIVIDUAL | NC TOOL | NC OPERATION | ERROR DISPLAY | TOOL COUNTER | ◁ 1/4 ▷ |
|---|---|---|---|---|---|---|---|---|
| MAIN SPINDLE TOOL FASTENED END | NC OVERRUN | | 0.000 | X-AXIS | | NC RESET | ERROR RESET | |
| MAIN SPINDLE HOME POSITION | OUTSIDE OF PERMISSIBLE TOLERANCE | | 0.000 | Y-AXIS | | COOLANT ON/OFF | NC RESET | |
| | | | 0.000 | Z-AXIS | | | | |
| ALL AXES NEAR ORIGINS | | | 0.000 | A-AXIS | | | | |
| | | | 0.000 | B-AXIS | | | | |
| | | FAST-FORWARD HIGH SPEED | | | NC START | PAUSE | | |
| | | FAST-FORWARD LOW SPEED | | | | | | |
| NC IN OPERATION | | EDIT | | BLOCK OPERATION | TOOL RETURN CYCLE | TOOL RETURN RESUME CYCLE | | |
| NC RUNNING | | MDI | | FLAG POINT OPERATION | | | | |
| NC PREP COMPLETE | | OPERATION | | CYCLE OPERATION | NC START | PAUSE | | |

CONTROL PANEL

INCORPORATION BY REFERENCE

The disclosure of Japanese Patent Application No. 2015-041795 filed on Mar. 3, 2015 including the specification, drawings and abstract is incorporated herein by reference in its entirety.

BACKGROUND OF THE INVENTION

1. Field of the Invention

The invention relates to a control panel that can be connected to a controller that controls an actuator.

2. Description of Related Art

There are many manufacturers of controllers that control an actuator of a machine tool or the like. Hence, the screen of a control panel for operating the controller is different for each manufacturer. Therefore, in a company that possesses a plurality of types of controllers, a worker must master the method of operation of the controller of each manufacturer, which requires a tremendous amount of work by the worker.

For example, Japanese Patent Application Publication No. 2000-315105 (JP 2000-315105 A) describes a control system that includes a machine tool, and a computer that is network-connected to the machine tool and controls the machine tool. The computer displays, on a screen of the computer, a plurality of operation icons having the same function as a plurality of operation buttons on the control panel of the machine tool. Moreover, the displayed operation icons are able to be selected. With this control system, remote control of the machine tool is easy. In addition, even if the kinds of machine tools that are connected to the network differ from each other, design changes to the control program are unnecessary, so program development work is able to be dramatically reduced.

Also, Japanese Patent Application Publication No. 10-31510 (JP 10-31510 A) describes an application device that is connected to a plurality of machine tools, and sets the data for, and monitors the operating states of, the plurality of machine tools. The application device is provided separately from control panels that are provided on the individual machine tools. The application device is able to command each machine tool without performing complicated operations.

With the technologies described in JP 2000-315105 A and JP 10-31510 A, a worker is able to control a target machine tool and the like by operating a device other than a control panel belonging to the machine tool. However, it is difficult to perform all operations of the individual machine tools with the other device. Therefore, when performing a complex operation, it is necessary to operate the control panels of the individual machine tools. That is, depending on the purpose, it is necessary to distinguish between a case in which the control panel of the machine tool is to be operated, and a case in which the device other than the control panel is to be operated, which is extremely troublesome.

SUMMARY OF THE INVENTION

The invention thus provides a control panel that enables an operator to easily ascertain the operation of a connected controller, even if the control panel is connected to a plurality of types of controllers, as well as easily perform precise settings.

One aspect of the invention relates to a control panel that is able to be connected to a plurality of types of controllers each capable of controlling an actuator. Each of the controllers includes a data storage element that stores data used to control the actuator, a special screen storage element that stores a special screen that displays the data, and an actuator control portion that controls the actuator.

The control panel includes an input portion to which an operation by an operator is input, a unified screen storage element that stores a unified screen that is a screen that is unified with respect to the plurality of types of controllers, and displays the data, a display portion that displays the special screen or the unified screen, and an operation control portion that switches between displaying the special screen and the unified screen on the display portion based on information input to the input portion, and controls the actuator control portion based on information input to the input portion.

The display portion of the control panel switches between displaying the special screen and the unified screen. When the unified screen is displayed on the display portion, the operator is able to obtain information about the controllers, by the unified screen, regardless of the types of the connected controllers. Therefore, if the information is displayed on the unified screen, the operator is able to easily obtain this information regardless of the types of the controllers. That is, even an unskilled operator is able to obtain information about the controllers, regardless of the types of controllers.

Meanwhile, if the information displayed on the unified screen is insufficient, the operator can obtain detailed information about the connected controllers by displaying the special screen on the display portion. That is, if the operator is able to see the special screen, the operator will be able to obtain detailed information by displaying the special screen on the display portion. Also, with a skilled operator, obtaining even some information from the unified screen saves work compared to constantly obtaining information from the special screen. That is, using the control panel, the operator is able to both easily ascertain the operation of the controllers, and easily perform detailed settings.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A system 1 according to one example embodiment will now be described with reference to FIG. 1. This system 1 is a machine tool, for example. Aside from a machine tool, the system 1 may also be applied to an industrial robot or the like. The system 1 includes an actuator 10a, a controller 20a, and a control panel 30.

In this example embodiment, the actuator 10a is an actuator that is provided on a machine structure main body of a machine tool. The actuator 10a is, for example, a servo motor for driving a movable body of the machine tool, an actuator that opens and closes a door, or an actuator that turns a magazine or drives a tool changer or the like.

The controller 20a controls the actuator 10a. In this example embodiment, the controller 20a includes a numerically controlled device for numerically controlling a servo motor, and a programmable logic controller (PLC) that controls other actuators, and the like.

The control panel 30 is a device used by an operator to operate and monitoring the controller 20a. The control panel 30 is able to be connected to a plurality of types of controllers 20a, 20b, and 20c. The plurality of types of controllers 20a, 20b, and 20c differ from each other in terms of the format, procedures, and protocol and the like regarding the operation screens of the controllers, command information for controlling the controllers, and information from the controllers. Also, for example, the control panel 30 may be configured to be able to connect to only one controller 20a, or to the plurality of controllers 20a, 20b, and 20c. The control panel 30 is connected to the controllers 20a, 20b, and 20c by a network, for example. Here, the controllers 20a, 20b, and 20c are manufactured by multiple manufacturers, but the control panel 30 is compatible with all of these different types of controllers 20a, 20b, and 20c. That is, the control panel 30 is able to control each of these different types of controllers 20a, 20b, and 20c.

The controller 20a includes a data storage element 21, a special screen storage element 22, an actuator control portion 23, and an interface 24. The data storage element 21 stores data used to control the actuator 10a. For example, the data used for the numerical control includes NC program data, coordinate values of axes such as an X-axis, a Y-axis, and a Z-axis of a movable body of a machine tool on an absolute coordinate system, and main spindle rotation speed and the like. The data used for the PLC control includes, for example, ON/OFF information of the actuator 10a and the like.

The special screen storage element 22 stores special screens 22a that display data stored in the data storage element 21. The special screens 22a stored in the special screen storage element 22 are designed by the manufacturer of the controller 20a. Therefore, the special screens 22a differ according to the manufacturer of the controller 20a. An example of one special screen 22a is shown in FIG. 2.

Figure 2:
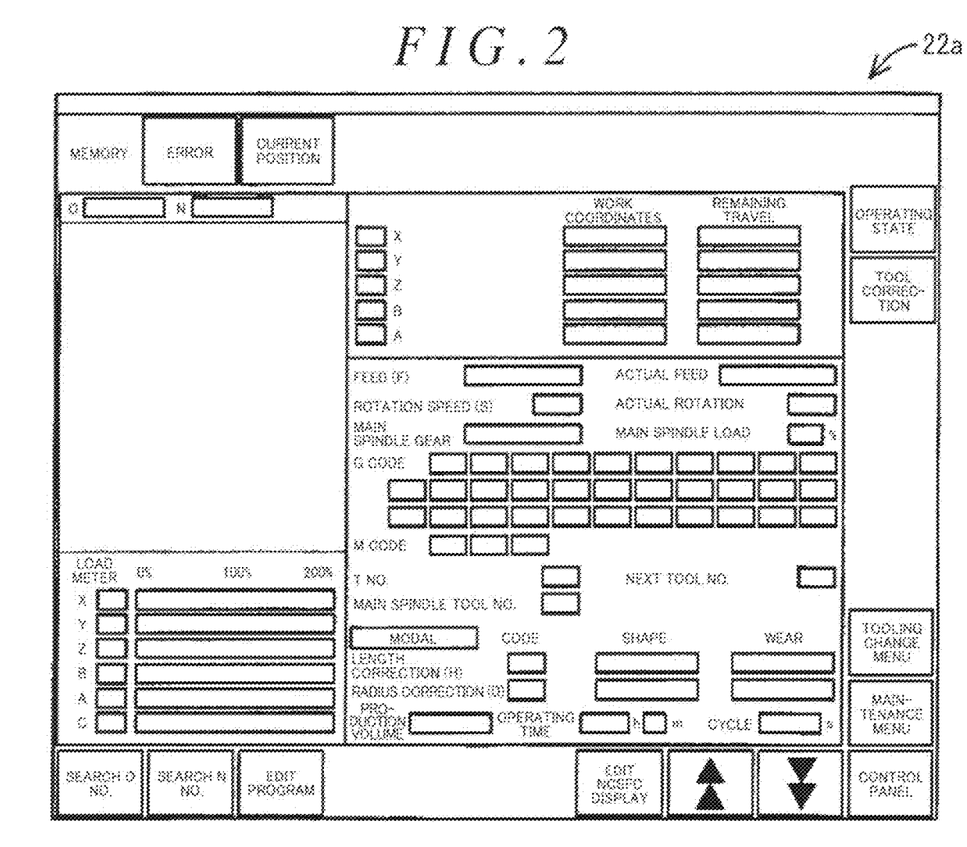
FIG. 2 is a view of a special screen stored in a special screen storage element shown in FIG. 1.

As shown in FIG. 2, the special screen 22a includes display items such as an NC program, a load meter for each axis, coordinates of each axis, remaining amount of travel to command position, a command value for a feed rate related to the main spindle, an actual feed rate, a command value for the rotation speed of the main spindle, the actual rotation speed of the main spindle, and each type of code, and the like. In addition to the screen shown in FIG. 2, the special screen 22a includes screens capable of performing various operations and monitoring. In FIG. 2, buttons linked to other special screens 22a are arranged in positions along the right edge of the special screen 22a and in positions along the lower edge of the special screen 22a. Also, each item in the special screen 22a is linked to the various data stored in the data storage element 21.

The actuator control portion 23 controls the actuator 10a based on data stored in the data storage element 21. The actuator control portion 23 communicates information back and forth between the data storage element 21 and the special screen storage element 22. Also, the interface 24 communicates with the control panel 30. The interface 24 is connected to the data storage element 21, the special screen storage element 22, and the actuator control portion 23.

The control panel 30 includes an input portion 31, a unified screen storage element 32, a display portion 33, an operation control portion 34, and an interface 35. The input portion 31 receives an operation by an operator. The input portion 31 is formed by a position input device on a touch panel and various kinds of buttons and the like.

The unified screen storage element 32 stores unified screens 32a to 32d that display data stored in the data storage element 21. The special screens 22a described above are special screens for the controller 20a, while the unified screens 32a to 32d are unified screens with respect to the various types of controllers 20a, 20b, and 20c. Various data stored in the data storage element 21 of the controller 20a is linked to each item in the unified screens 32a to 32d. That is, the links of the items in the unified screens 32a to 32d are set differently depending on the type of controller 20a. Therefore, the screen design of the unified screens 32a to 32d is standardized regardless of the type of controller 20a that the control panel 30 is connected to.

One example of the unified screens 32a to 32d is shown in FIGS. 3 to 6. A display column for the coordinates on a machine coordinate system of each axis is arranged toward the right in the center of the unified screen 32a shown in FIG. 3. Also, buttons for starting and stopping various operations and displaying the operating state, and buttons for performing operations such as turning coolant on/off and displaying the operating state, are arranged in the center portion of the unified screen 32a. Buttons linked to the other unified screens 32b to 32d are arranged in positions along the right edge of the unified screen 32a.

Figure 3:
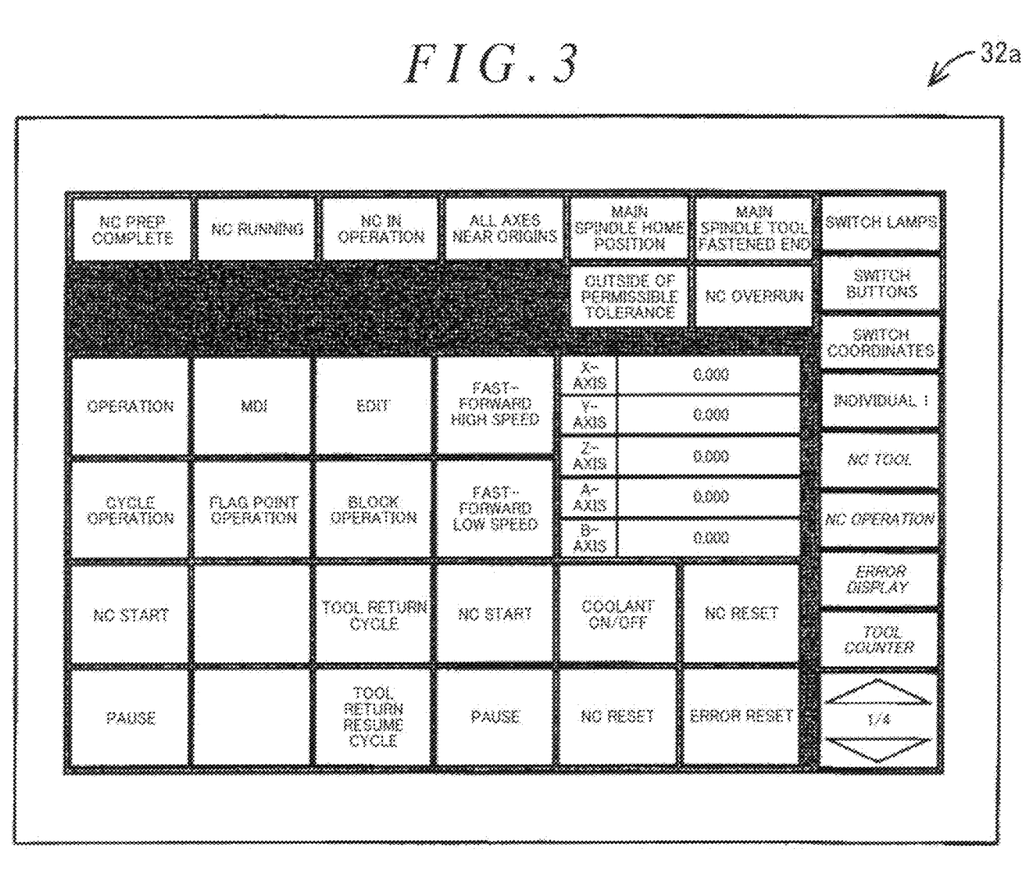
FIG. 3 is a view of one unified screen stored in a unified screen storage element shown in FIG. 1.
Figure 4:
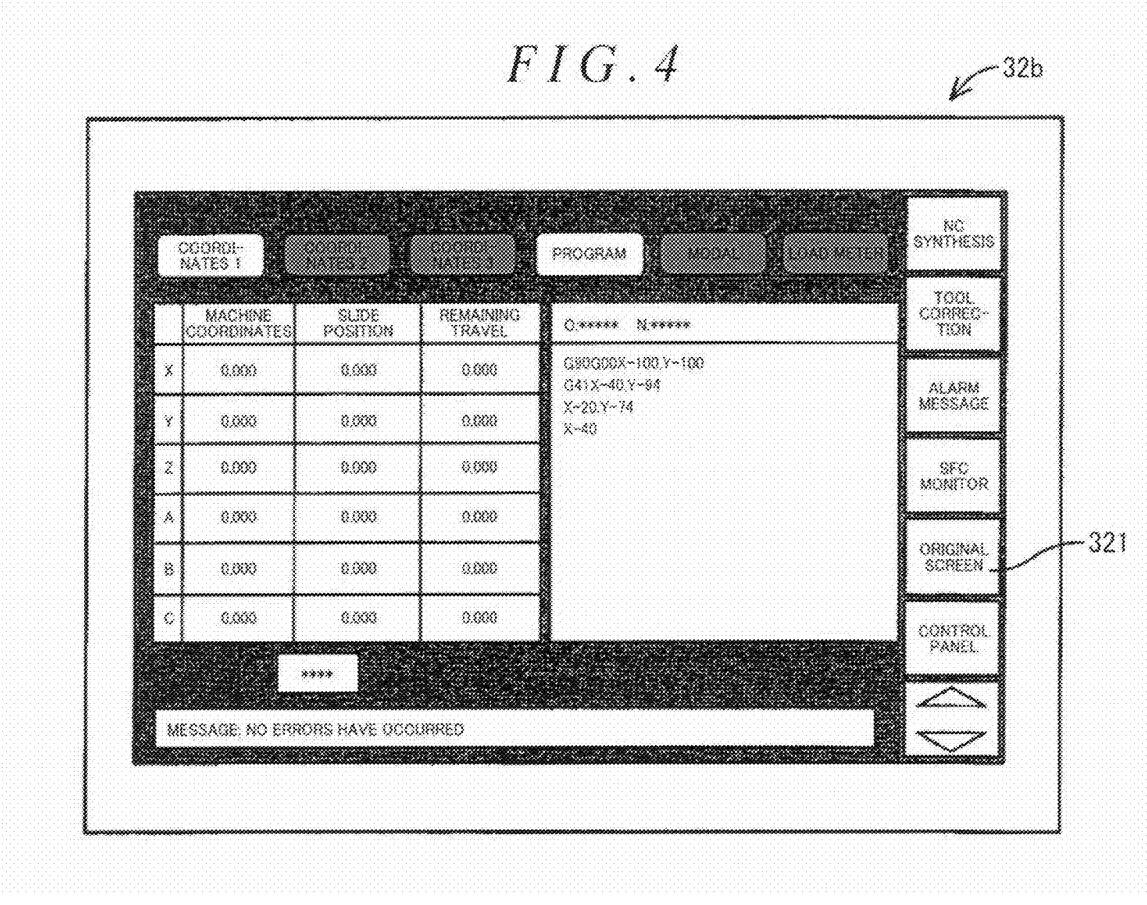
FIG. 4 is a view of another unified screen stored in the unified screen storage element shown in FIG. 1.
Figure 5:
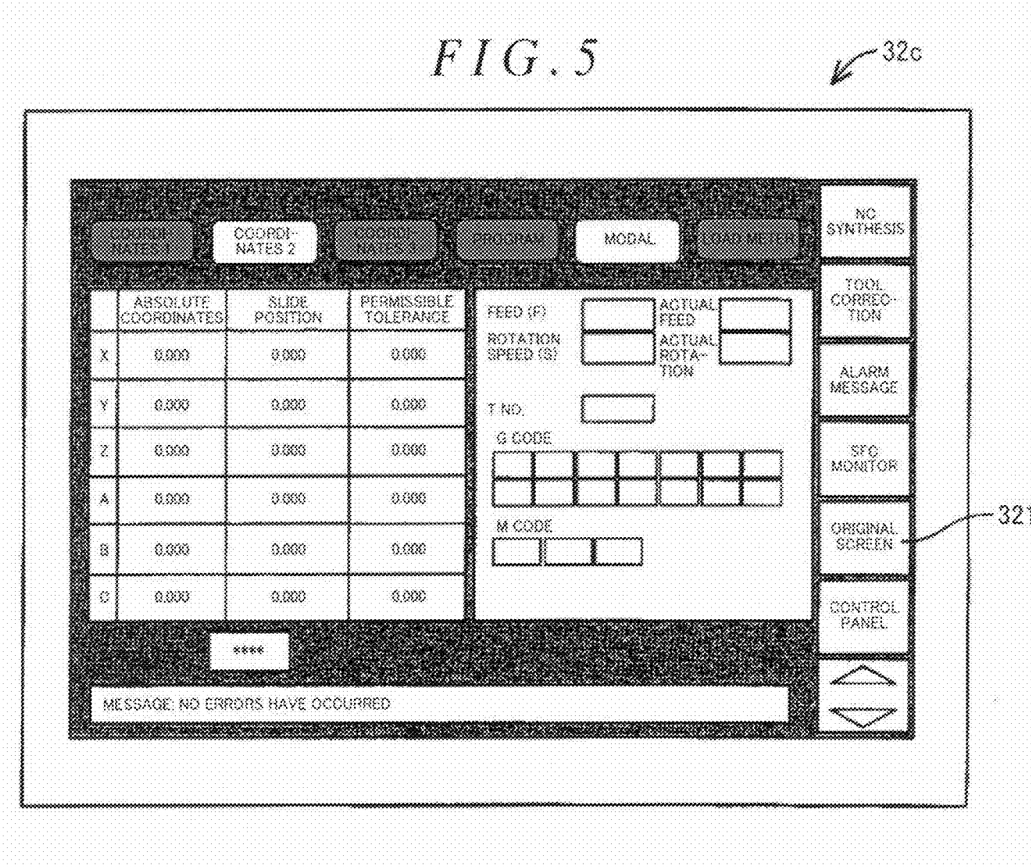
FIG. 5 is a view of another unified screen stored in the unified screen storage element shown in FIG. 1.

The "NC TOOL" button on the unified screen 32a is linked to the unified screen 32b shown in FIG. 4. The screen linked to the "COORDINATES 2" and "MODAL" buttons arranged in the top row on the unified screen 32b is the unified screen 32c shown in FIG. 5. Also, the screen linked to the "COORDINATES 3" and "LOAD METER" buttons arranged in the top row on the unified screens 32b and 32c shown in FIGS. 4 and 5 is the unified screen 32d shown in FIG. 6. On the unified screens 32b to 32d shown in FIGS. 4 to 6, the "COORDINATES 1", "COORDINATES 2", "COORDINATES 3", "PROGRAM", "MODAL", AND "LOAD METER" are each linked independently, and the unified screens 32b to 32d are able to be screens on which "COORDINATES 1" and "MODAL" are displayed, for example.

Figure 6:
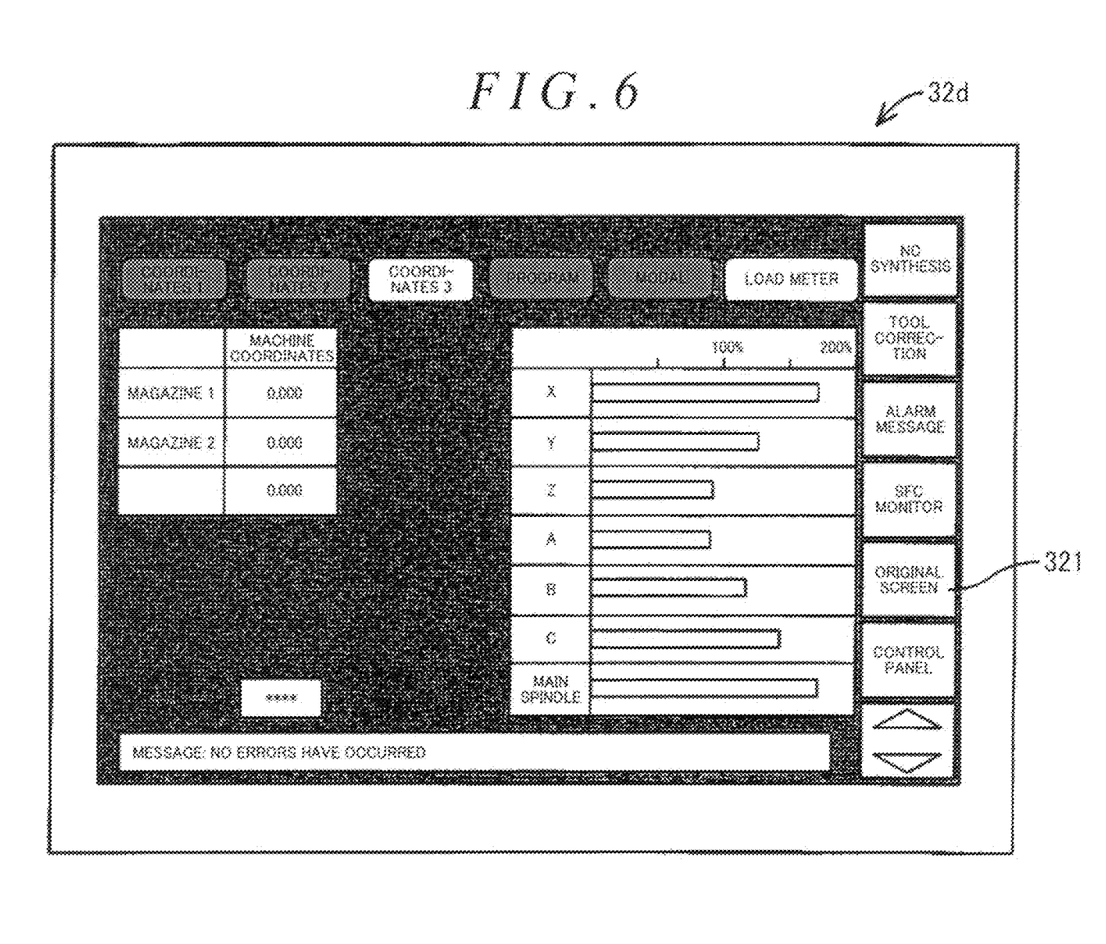
FIG. 6 is a view of another unified screen stored in the unified screen storage element shown in FIG. 1.

Here, "COORDINATES 1", "COORDINATES 2", AND "COORDINATES 3" include the coordinates of the axes and information related to the axes. "PROGRAM" displays the NC program that is currently running, and portions corresponding to the sequence of the currently running NC program. "MODAL" displays the feed rate of a movable body, the rotation speed of the main spindle, and information regarding each code currently running. "LOAD METER" displays the load percentage for each axis.

Also, buttons linked to other screens are arranged in positions along the right edge of the unified screens 32b to 32d. Here, the "CONTROL PANEL" button in the unified screens 32b to 32d shown in FIGS. 4 to 6 are linked to the unified screen 32a shown in FIG. 3, and is a button for switching from the unified screens 32b to 32d to the unified screen 32a. A first switching button 321 that is the "ORIGINAL SCREEN" button in the unified screens 32b to 32d shown in FIGS. 4 to 6 is linked to the special screen 22a stored in the special screen storage element 22, and is a button for switching from the unified screens 32b to 32d to the special screen 22a.

Figure 7:
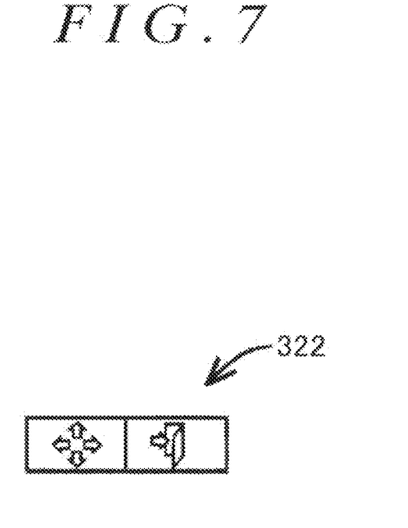
FIG. 7 is a view of a second switching icon stored in the unified screen storage element shown in FIG. 1.

The unified screen storage element 32 stores a second switching icon 322 shown in FIG. 7, in addition to the unified screens 32a to 32d. The second switching icon 322 is an icon displayed on the display portion 33 when the special screen 22a is displayed. The second switching icon 322 is linked to the unified screen 32b, and is an icon for switching from the special screen 22a to the unified screen 32b.

Figure 8:
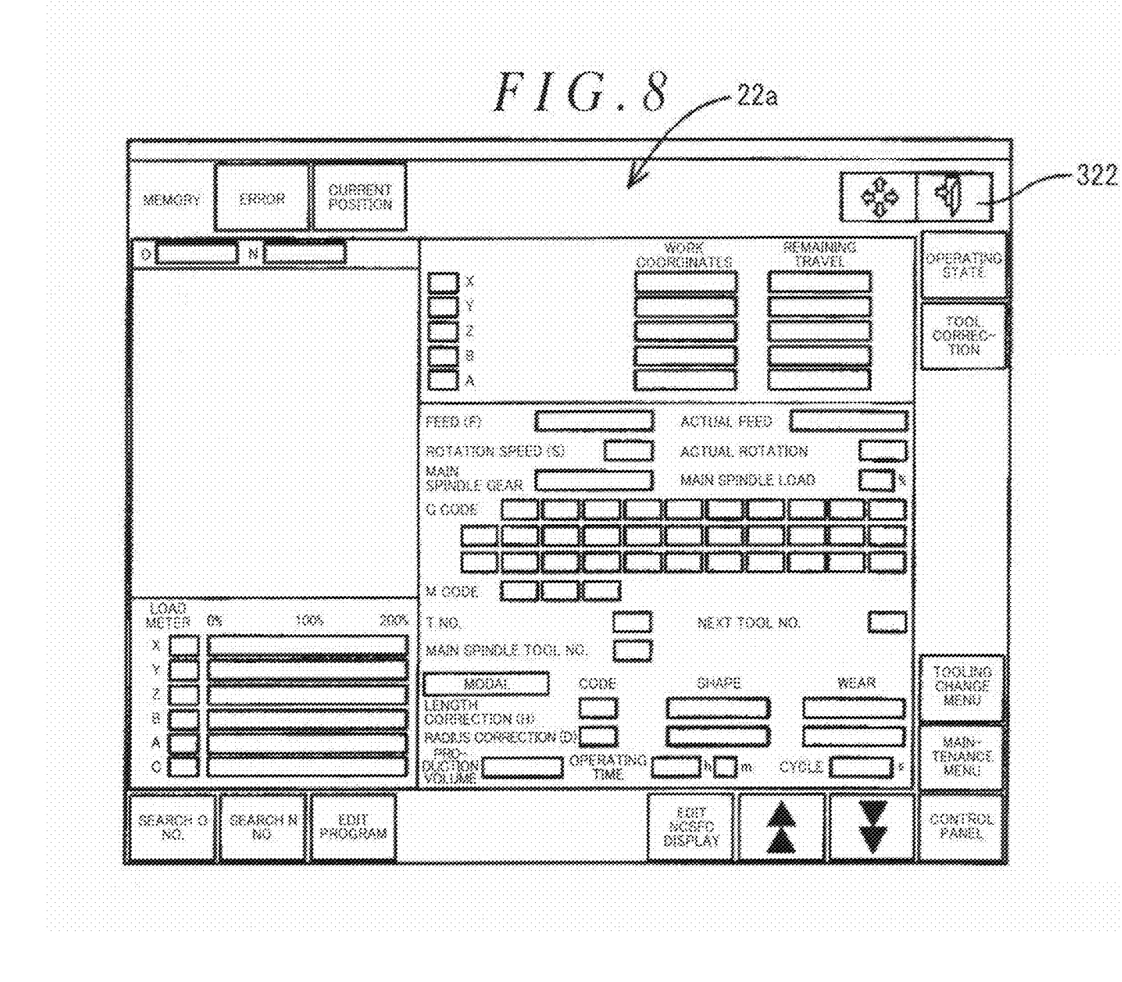
FIG. 8 is a view of a display screen on which the special screen and the second switching icon are displayed.
Figure 9:
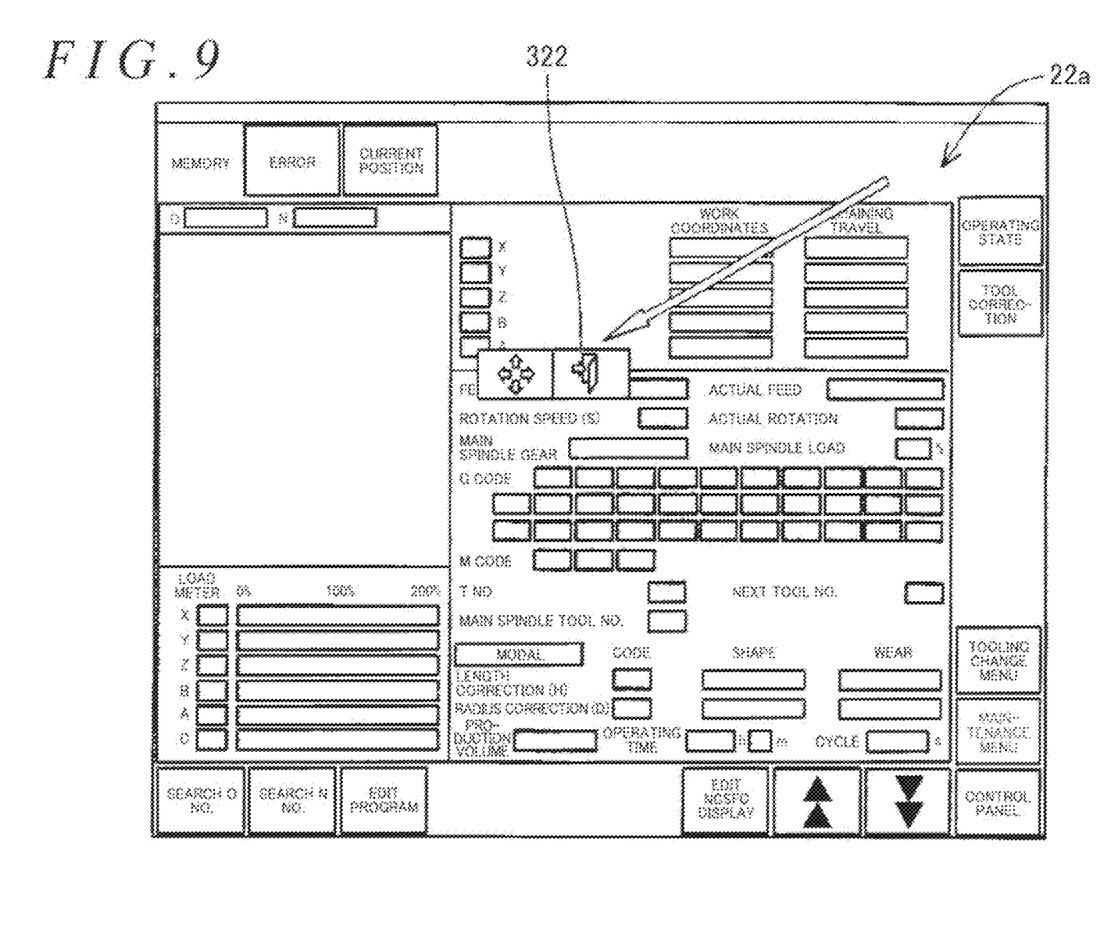
FIG. 9 is a view of a display screen in a state in which the display position of the second switching icon has been changed from that on the display screen shown in FIG. 8.

When the special screen 22a is displayed on the display portion 33, the screen on which the second switching icon 322 is displayed is as shown in FIG. 8. The second switching icon 322 is positioned at the upper right in FIG. 8. However, the position of the second switching icon 322 on the special screen 22a may be changed freely. FIG. 9 is a view of a state in which the position of the second switching icon 322 has been changed.

The display portion 33 is able to display the special screen 22a and the unified screens 32a to 32d. In this example embodiment, the display portion 33 is a touch panel. That is, the touch panel is a panel in which the input portion 31 is integrated with the display portion 33.

The operation control portion 34 transfers information to and from the data storage element 21 of the controller 20a, the special screen storage element 22, and the actuator control portion 23, by communicating with the controller 20a via the interface 35. The operation control portion 34 switches between displaying the special screen 22a and the unified screens 32a to 32d on the display portion 33, based on the information input to the input portion 31.

That is, the operation control portion 34 displays the unified screens 32a to 32d shown in FIGS. 3 to 6 on the display portion 33, by obtaining the unified screens 32a to 32d stored in the unified screen storage element 32, and obtaining data in the data storage element 21 of the controller 20a via the interfaces 24 and 35.

For example, when the unified screen 32a shown in FIG. 3 is displayed on the display portion 33 and a touch operation of the "NC TOOL" button is input to the input portion 31, the unified screen 32b shown in FIG. 4 is displayed on the display portion 33. When the unified screen 32b shown in FIG. 4 is displayed on the display portion 33 and touch operations of the "COORDINATES 2" and "MODAL" buttons are input to the input portion 31, the unified screen 32c shown in FIG. 5 is displayed on the display portion 33. When the unified screen 32c shown in FIG. 5 is displayed on the display portion 33 and touch operations of the "COORDINATES 3" and "LOAD METER" buttons are input to the input portion 31, the unified screen 32d shown in FIG. 6 is displayed on the display portion 33.

When the unified screens 32b to 32d shown in FIGS. 4 to 6 are displayed on the display portion 33 and a touch operation of the first switching button 321 that is the "ORIGINAL SCREEN" button is input to the input portion 31, the operation control portion 34 switches from displaying the unified screens 32b to 32d on the display portion 33 to displaying the special screen 22a shown in FIG. 8 on the display portion 33.

At this time, the operation control portion 34 displays the special screen 22a shown in FIG. 8 on the display portion 33 by obtaining the special screen 22a of the controller 20a and the data in the data storage element 21 via the interfaces 24 and 35. Furthermore, when the special screen 22a is displayed on the display portion 33, the operation control portion 34 displays the second switching icon 322 stored in the unified screen storage element 32 on the display portion 33. That is, the special screen 22a and the second switching icon 322 are simultaneously displayed on the display portion 33, as shown in FIG. 8.

Moreover, when the special screen 22a and the second switching icon 322 are displayed on the display portion 33 as shown in FIG. 8 and an operation to change the position of the second switching icon 322 is input to the input portion 31, the operation control portion 34 moves the display position of the second switching icon 322 on the display portion 33 as shown in FIG. 9, for example.

Also, when the special screen 22a and the second switching icon 322 are displayed on the display portion 33 as shown in FIG. 8 or 9 and a touch operation of the second switching icon 322 is input to the input portion 31, the operation control portion 34 switches from displaying the special screen 22a and the second switching icon 322 on the display portion 33 to displaying the unified screen 32b shown in FIG. 4 on the display portion 33.

Further, the operation control portion 34 controls the actuator control portion 23 of the controller 20a based on information input to the input portion 31. For example, when the unified screen 32a is displayed on the display portion 33 and a touch operation of the "NC START" button is input to the input portion 31, the operation control portion 34 starts to control the actuator 10a based on the NC program in the actuator control portion 23 via the interfaces 24 and 35.

Figure 10:
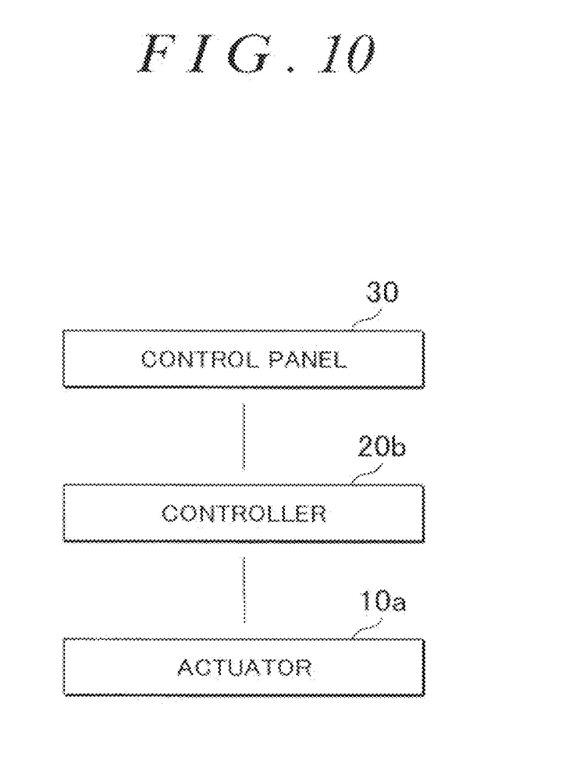
FIG. 10 is a block diagram of a system in which a controller different from that shown in FIG. 1 is connected to a control panel.

The structure in which the control panel 30 is connected to another controller 20b will now be described with reference to FIG. 10. In FIG. 1, an example is shown in which the control panel 30 is connected to the controller 20a. In FIG. 10, the control panel 30 is connected to the controller 20b that is different from the controller 20a. The controller 20b controls an actuator 10a that is the same as the actuator 10a shown in FIG. 1. In this way, even when the actuator 10a is the same, there are configurations in which the types of controllers 20a and 20b differ. In this case as well, the control panel 30 is common, and the unified screens 32a to 32d are common screens. However, the items on the unified screens 32a to 32d must be linked to the various types of data of the corresponding controller 20b.

Figure 11:
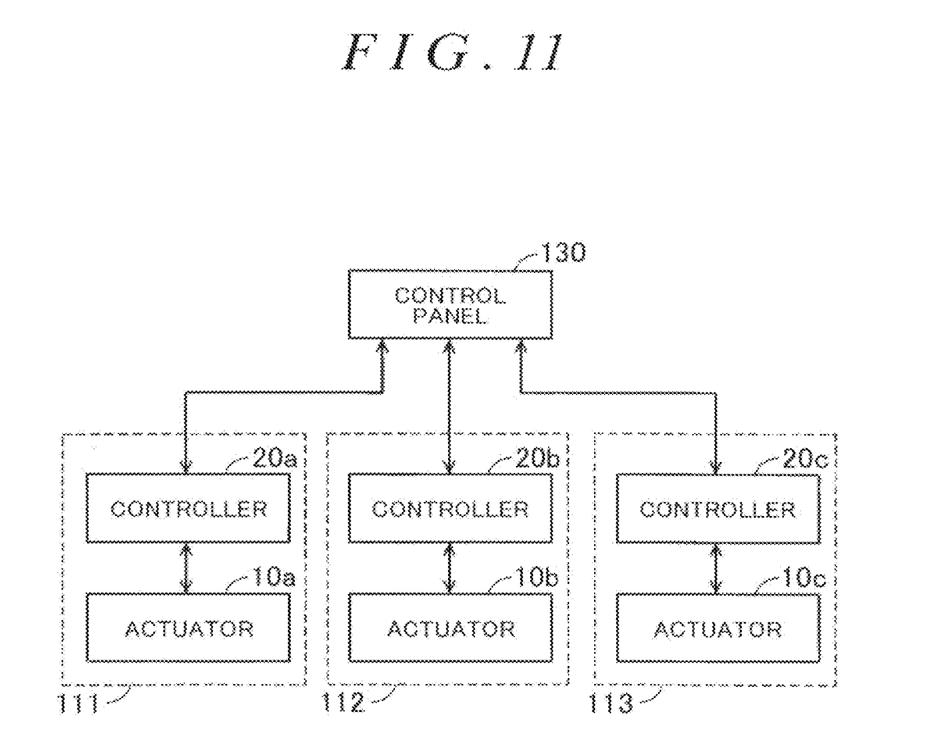
FIG. 11 is a block diagram of a system in which a plurality of types of controllers are connected to a control panel.

In the description above, the control panel 30 is connected to only one of the plurality of types of controllers 20a, 20b, and 20c, and the operation control portion 34 displays the data stored in the data storage element 21 of the connected controller 20a when the unified screens 32a to 32d are displayed on the display portion 33. Aside from this, a single control panel 130 may also be connected to a plurality of types of controllers 20a, 20b, and 20c, as shown in FIG. 11.

Here, the controller 20a controls the actuator 10a, the controller 20b controls an actuator 10b, and the controller 20c controls an actuator 10c. The actuator 10a and the controller 20a form a single machine tool unit 111 without the function of the control panel 130. The actuator 10b and the controller 20b form a single machine tool unit 112 without the function of the control panel 130. The actuator 10c and the controller 20c form a single machine tool unit 113 without the function of the control panel 130.

In this case, the unified screens 32a to 32d include buttons for selecting the controller to be displayed, from among the plurality of types of controllers 20a, 20b, and 20c. Then, when the unified screens 32a to 32d are displayed on the display portion 33 and a selection operation of the controller to be displayed that is selected from among the plurality of types of controllers 20a, 20b, and 20c is input to the input portion 31, the operation control portion 34 displays the data stored in the data storage element 21 of the controllers 20a, 20b, and 20c corresponding to the controller to be displayed.

The control panel 30 and 130 is able to be connected to the plurality of types of controllers 20a, 20b, and 20c that are capable of controlling the actuators 10a, 10b, and 10c. The controllers 20a, 20b, and 20c each include the data storage element 21 that stores data used to control the actuators 10a, 10b, and 10c, the special screen storage element 22 that stores the special screens 22a that display data, and the actuator control portion 23 that controls the actuators 10a, 10b, and 10c.

The control panel 30 and 130 includes the input portion 31 that receives an operation by the operator (i.e., the input portion 31 to which an operation by the operator is input), the unified screen storage element 32 that stores the unified screens 32a to 32d that display data and are screens that are unified with respect to the plurality of types of controllers 20a, 20b, and 20c, the display portion 33 that is capable of displaying the special screens 22a and the unified screens 32a to 32d, and the operation control portion 34 that switches between displaying the special screen 22a and the unified screens 32a to 32d on the display portion 33 based on information input to the input portion 31, and controls the actuator control portion 23 based on information input to the input portion 31.

Just as described above, the display portion 33 of the control panel 30 and 130 switches between displaying the special screen 22a and the unified screens 32a to 32d. When the unified screens 32a to 32d are displayed on the display portion 33, the operator is able to obtain information about the connected controllers 20a, 20b, and 20c by the unified screen, regardless of the types of the connected controllers 20a, 20b, and 20c. Therefore, if the information is displayed on the unified screens 32a to 32d, the operator is able to easily obtain this information, regardless of the types of the controllers 20a, 20b, and 20c. That is, even an unskilled operator is able to obtain information about the controllers 20a, 20b, and 20c, regardless of the types of controllers 20a, 20b, and 20c.

Meanwhile, if the information displayed on the unified screens 32a to 32d is insufficient, the operator can obtain detailed information about the connected controllers 20a, 20b, and 20c by displaying the special screens 22a on the display portion 33. That is, if the operator is able to see the special screens 22a, the operator will be able to obtain detailed information by displaying the special screens 22a on the display portion 33. Also, with a skilled operator, obtaining even some information from the unified screens 32a to 32d saves work compared to constantly obtaining information from the special screens 22a. That is, using the control panel 30 and 130, the operator is able to both easily ascertain the operation of the controllers 20a, 20b, and 20c, and easily perform detailed settings.

Also, the unified screens 32b to 32d include the first switching button 321 that switches from the unified screens 32b to 32d to the special screen 22a. When the unified screens 32b to 32d are being displayed on the display portion 33 and an operation of the first switching button 321 is input to the input portion 31 by the operator, the operation control portion 34 switches from displaying the unified screens 32b to 32d on the display portion 33 to displaying the special screen 22a on the display portion 33. As a result, operability of switching from the unified screens 32b to 32d to the special screen 22a by the user is improved.

Also, the unified screen storage element 32 stores the second switching icon 322 that switches from the special screen 22a to the unified screens 32b to 32d. The operation control portion 34 displays the second switching icon 322 on the display portion 33 when the special screen 22a is displayed on the display portion 33. Further, when an operation of the second switching icon 322 is input to the input portion 31 by the operator, the operation control portion 34 switches from displaying the special screen 22a on the display portion 33 to displaying the unified screens 32b to 32d on the display portion 33.

Here, the special screen 22a is a screen determined by the manufacturers of the controllers 20a, 20b, and 20c. Therefore, the special screen 22a itself does not include the button for switching to the unified screens 32b to 32d. Thus, by storing the second switching icon 322 in the unified screen storage element 32 and having the second switching icon 322 be displayed together with the special screen 22a, the operator is able to switch from the special screen 22a to the unified screens 32b to 32d.

Also, when the special screen 22a and the second switching icon 322 are displayed on the display portion 33, the operation control portion 34 moves the display position of the second switching icon 322 on the display portion 33 based on an operation input to the input portion 31. The second switching icon 322 was not originally taken into account in the design of the special screen 22a. Therefore, if the display position of the second switching icon 322 were to be fixed, some of the displayed content of the special screen 22a would be obscured, and as a result, the operator would not be able to identify some of the displayed content of the special screen 22a. However, because the display position of the second switching icon 322 is able to be moved freely by an operation of the operator, the operator is able to identify all of the displayed content of the special screen 22a.

Figure 1:
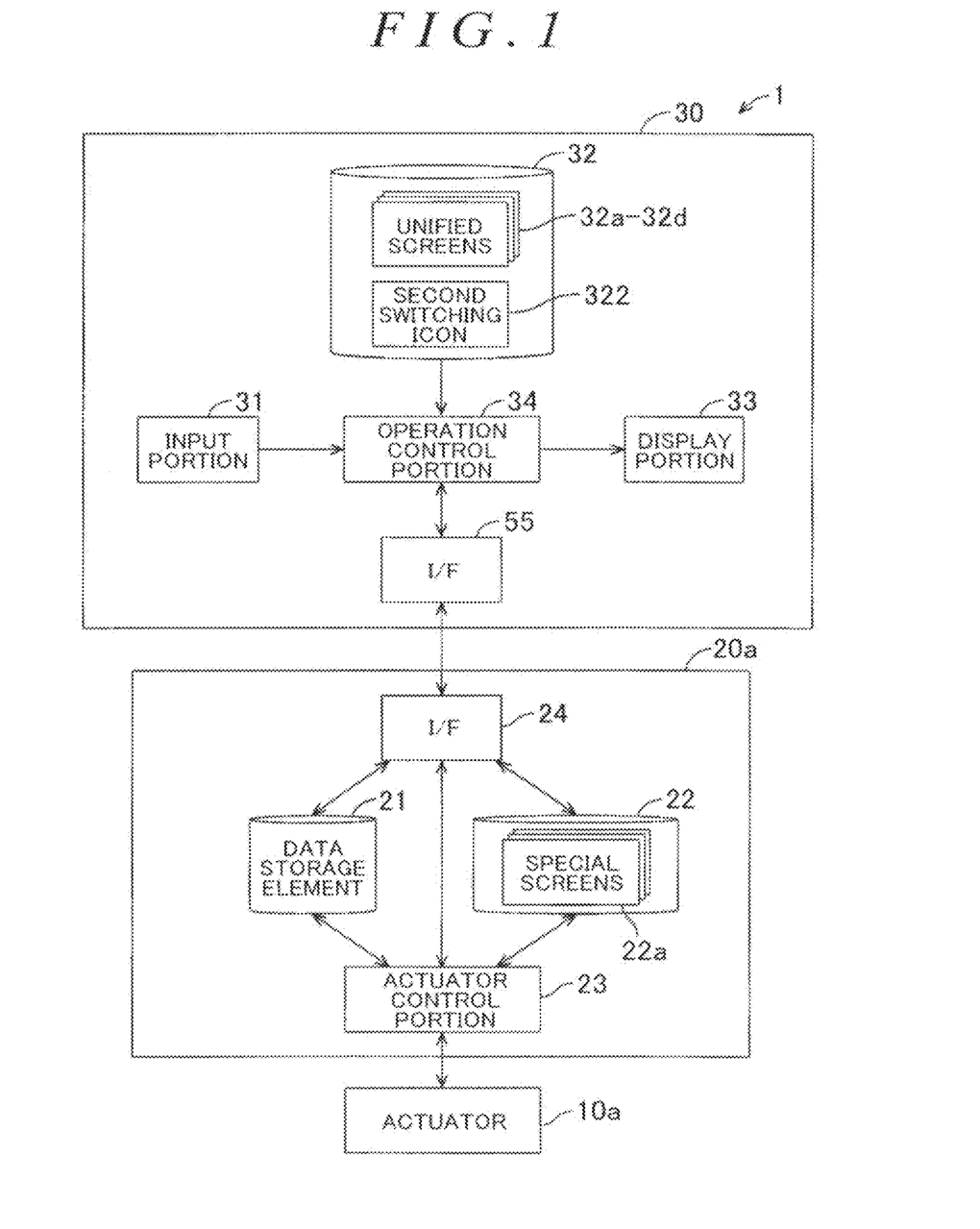
FIG. 1 is a block diagram of a system that includes a control panel according to one example embodiment of the invention.

Also, as shown in FIGS. 1 and 10, the control panel 30 is a device to which only one of the plurality of types of controllers 20a, 20b, and 20c is connected, and the operation control portion 34 displays the data stored in the data storage element 21 of the connected controller 20a when the unified screens 32a to 32d are displayed on the display portion 33. Therefore, regardless of which controller 20a, 20b, and 20c the control panel 30 and 130 is connected to, the content displayed on the display portion 33 of the control panel 30 and 130 will be data corresponding to the connected controller 20a, 20b, and 20c.

Also, as shown in FIG. 11, the control panel 130 is connected to the plurality of types of controllers 20a, 20b, and 20c. Then, the input portion 31 receives a controller to be displayed that has been selected from among the various types of controllers 20a, 20b, and 20c by an operation of the operator, and the operation control portion 34 displays data stored in the data storage element 21 of the controllers 20a, 20b, and 20c corresponding to the controller to be displayed from among the plurality of types of controllers 20a, 20b, and 20c, when the unified screens 32a to 32d are displayed on the display portion 33.

When the control panel 130 is connected to the plurality of types of controllers 20a, 20b, and 20c, the unified screens 32a to 32d will include data corresponding to the selected controller to be displayed. Therefore, the operator will be able to operate and monitor the selected controllers 20a, 20b, and 20c. Also, when data of the plurality of types of controllers 20a, 20b, and 20c is displayed on the display portion 33, the screen design of the unified screens 32a to 32d is identical. Therefore, the operator will be able to easily operate and monitor the selected controllers 20a, 20b, and 20c. Also, a case is illustrated in which the plurality of controllers 20a, 20b, and 20c are connected to the control panel 130, but the controllers that are connected to the control panel 130 may include a plurality of the same type of controller. In addition, the button of "NC START" may be displayed as "NC CYCLE". Similarly, the buttons of "NC PREP COMPLETE", "NC RUNNING", "NC IN OPERATION", "ALL AXES NEAR ORIGINS", and "MAIN SPINDLE HOME POSITION" may be displayed as "NC READY", "NC EXECUTE", "NC RUNNING", "ALL AXES NEAR ZERO POS.", and "SPINDLE FIXED POS.", respectively.

What is claimed is:

1. A control panel that is able to be connected to a plurality of types of controllers of a machine tool, each of the controllers capable of controlling an actuator, each of the controllers including a data storage element that stores data used to control the actuator, a special screen storage element that stores a special screen that displays the data, and an actuator control portion that controls the actuator, the control panel comprising:
   an input portion to which an operation by an operator is input;
   a unified screen storage element that stores a unified screen, which is a screen that is unified with respect to the plurality of types of controllers of a machine tool and that displays the data;
   a display portion that is configured to display the special screen and that is configured to display the unified screen, the special screen having been previously designed specifically for its respective controller; and
   an operation control portion that switches between displaying the special screen and the unified screen on the display portion based on information input to the input portion, and controls the actuator control portion based on information input to the input portion,
   wherein items on the unified screen are linked to various types of data from the plurality of types of controllers of a machine tool.

2. The control panel according to claim 1, wherein
   the unified screen includes a first switching button that switches from the unified screen to the special screen; and
   the operation control portion switches from displaying the unified screen on the display portion to displaying the special screen on the display portion when the unified screen is being displayed on the display portion and an operation of the first switching button by the operator is input to the input portion.

3. The control panel according to claim 1, wherein
   the unified screen storage element stores a second switching icon for switching from the special screen to the unified screen; and
   the operation control portion
      displays the second switching icon on the display portion when the special screen is displayed on the display portion, and
      switches from displaying the special screen on the display portion to displaying the unified screen on the display portion when an operation of the second switching icon by the operator is input to the input portion.

4. The control panel according to claim 3, wherein the operation control portion moves a display position of the second switching icon on the display portion based on the operation input to the input portion when the special screen and the second switching icon are displayed on the display portion.

5. The control panel according to claim 1, wherein
   the control panel is a device to which only one of the plurality of types of controllers is connected; and
   the operation control portion displays the data stored in the data storage element of the connected controller when the unified screen is displayed on the display portion.

6. The control panel according to claim 1, wherein
   the control panel is connected to the plurality of types of controllers;
   a selection operation of a controller to be displayed that is selected from among the plurality of types of controllers is input by the operator to the input portion; and
   the operation control portion displays the data stored in the data storage element of the controller corresponding to the controller to be displayed, from among the plurality of types of controllers, when the unified screen is displayed on the display portion.

7. The control panel according to claim 6, wherein the unified screen storage element stores a plurality of unified screens, each of which is a screen whose design is standardized regardless of the type of the plurality of types of controllers connected to the control panel.

8. The control panel according to claim 1, wherein
   the control panel is a device to which only one of the controllers is connected; and
   the operation control portion displays the data stored in the data storage element of the connected controller when the unified screen is displayed on the display portion.

9. The control panel according to claim 1, wherein the special screen was designed by a manufacturer of its respective controller.

10. The control panel according to claim 1, further comprising an interface configured to retrieve the special screen from the special screen storage element of the respective controller.

* * * * *